(12) United States Patent
Schwartz et al.

(10) Patent No.: US 10,563,564 B2
(45) Date of Patent: Feb. 18, 2020

(54) COOLING FAN AND ACTIVE GRILLE SHUTTER CONTROL

(71) Applicant: FORD GLOBAL TECHNOLOGIES, LLC, Dearborn, MI (US)

(72) Inventors: William Samuel Schwartz, Pleasant Ridge, MI (US); Quazi Ehtesham Hussain, Holland, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 15/413,839

(22) Filed: Jan. 24, 2017

(65) Prior Publication Data

US 2018/0209324 A1    Jul. 26, 2018

(51) Int. Cl.
*F01P 7/04* (2006.01)
*F01P 7/10* (2006.01)

(52) U.S. Cl.
CPC ............... *F01P 7/048* (2013.01); *F01P 7/10* (2013.01); *Y02T 10/84* (2013.01)

(58) Field of Classification Search
CPC ...... F01P 7/12; F01P 7/018; F01P 7/00; F01P 5/02; F01P 7/06
See application file for complete search history.

(56) References Cited

U.S. PATENT DOCUMENTS

| | | | |
|---|---|---|---|
| 8,655,545 B2 | 2/2014 | Yu et al. | |
| 8,667,931 B2 * | 3/2014 | Kerns | F01P 7/10 123/41.05 |
| 2011/0005851 A1 | 1/2011 | Doroghazi et al. | |
| 2014/0297081 A1 | 10/2014 | Asami et al. | |
| 2015/0149043 A1 | 5/2015 | Macfarlane et al. | |

FOREIGN PATENT DOCUMENTS

CN    102120416 B    9/2015

OTHER PUBLICATIONS

English Machine Translation of CN102120416B.

* cited by examiner

*Primary Examiner* — Kevin A Lathers
(74) *Attorney, Agent, or Firm* — Jason Rogers; Vichit Chea; King & Schickli, PLLC

(57) ABSTRACT

A system for optimizing power consumption of a vehicle includes a cooling fan, an active grille shutter (AGS) system, and a plurality of heat exchangers. At least one controller is provided including a processor including computer-executable instructions for selecting a pairing of a cooling fan speed and AGS system position to provide a required airflow to a dominant one of the plurality of heat exchangers, or to an entire vehicle component system, at a minimum total combined cooling fan and AGS system power consumption. Methods for optimizing vehicle power consumption are described utilizing the system.

18 Claims, 6 Drawing Sheets

COOLING FAN AND ACTIVE GRILLE SHUTTER CONTROL

TECHNICAL FIELD

This disclosure relates generally to vehicle airflow and cooling. More particularly, the disclosure relates to power consumption control strategies for vehicles equipped with cooling fans and active grille shutter (AGS) systems, and to systems for implementing same.

BACKGROUND

Many devices and systems are provided to control heat build-up in a vehicle. For example, conventionally a cooling fan powered by the vehicle electrical system is provided to provide airflow over and through various components of the vehicle cooling module(s) such as the radiator, oil cooler, transmission fluid coolers, and other heat exchangers which may be disposed in the engine compartment or associated with the drivetrain. Likewise, it is known to provide active grille shutter (AGS) systems which typically comprise a plurality of louvers or shutters which can be pivoted to a variety of angles between a fully opened configuration and a fully shut configuration. Indeed, it is known to provide AGS systems comprising upper and lower louver or shutter assemblies, allowing control of the amount of exterior air entering the engine compartment and/or passing over elements of the vehicle drivetrain. AGS systems are often used as supplemental cooling systems to increase/decrease exterior airflow into the engine compartment and/or over components of the drivetrain, particularly when a vehicle is in motion.

Each of these systems consumes power, albeit in different ways. The cooling fan requires power derived from a vehicle system to operate, and power usage is controlled simply by controlling a fan speed. The airflow provided by the AGS system is controlled by adjusting the shutters to a desired position or opening level between a fully closed (least airflow and least aerodynamic drag) configuration to a fully open (most airflow and most aerodynamic drag) configuration. Vehicle power consumption relating to AGS system operation is primarily a function of the aerodynamic drag created by the selected AGS system position.

A required level of airflow into/through the vehicle engine compartment and/or over components of the drivetrain may be achieved by a combination of cooling fan speed settings and AGS position. For example, a same level of airflow may be achievable by a higher cooling fan speed setting and a more closed AGS setting, or alternatively by a lower cooling fan speed setting and a more open AGS setting. However, each combination of AGS position/setting and cooling fan speed results in very different vehicle total power consumption levels due to cooling fan power consumption and aerodynamic drag differences associated with individual pairings. A particular combination of AGS setting and cooling fan speed may provide a desired or required level of cooling airflow over one or more vehicle heat exchangers, but may be undesirable in terms of vehicle power consumption and efficiency. Accordingly, a need is identified for methods and systems for minimizing the power consumption required to provide a desired airflow to/over/through one or more vehicle heat exchangers and other components of the vehicle cooling module in vehicles using a combination of a cooling fan and an AGS system.

To solve this and other problems, the present disclosure relates to methods for controlling power consumption in vehicles wherein cooling airflow to various vehicle heat exchangers is provided by a combination of a cooling fan and an AGS system, and to systems for implementing the methods.

SUMMARY

In accordance with the purposes and benefits described herein, in one aspect a system for optimizing power consumption of a vehicle is provided, comprising a cooling fan, an active grille shutter (AGS) system, and a plurality of heat exchangers. At least one controller is provided including a processor comprising computer-executable instructions for selecting a pairing of a cooling fan speed and AGS system position to provide a required airflow to a dominant one of the plurality of heat exchangers at a least cooling fan/AGS power consumption.

In embodiments, the controller selects the pairing according to a vehicle rate of travel, and is operatively connected to a control system for the cooling fan and a control system for the AGS system. The controller may select the pairing from one or more stored look-up tables comprising a plurality of cooling fan speed values and a plurality of AGS position values, all mapped to a plurality of vehicle speed values and a plurality of heat exchanger airflow requirement values. In embodiments, a separate stored look-up table is provided for each one of the plurality of heat exchangers.

In another aspect, a method for optimizing vehicle power consumption is described comprising, in a vehicle, providing a plurality of heat exchangers, a cooling fan, and an active grille shutter (AGS) system. At least one controller including a processor comprising computer-executable instructions is also provided, operatively connected to a control system for the cooling fan and a control system for the AGS system. The controller selects a pairing of a cooling fan speed and an AGS system position which provides a required airflow to a dominant one of the plurality of heat exchangers at a least possible cooling fan/AGS power consumption. In embodiments, the pairing is selected further according to a vehicle rate of travel. The plurality of heat exchangers may be disposed in a vehicle engine compartment and/or associated with a vehicle drivetrain.

In embodiments, the controller is configured to select the pairing from one or more stored look-up tables comprising a plurality of cooling fan speed values and a plurality of AGS position values, all mapped to a plurality of vehicle speed values and a plurality of heat exchanger airflow requirement values. In embodiments, a separate stored look-up table is provided for each one of the plurality of heat exchangers.

In one embodiment, the method includes steps of, by the controller, determining whether the selected pairing provides a required airflow for others of the plurality of heat exchangers, and if not, selecting a different pairing which provides the required airflow for others of the plurality of heat exchangers at a least possible cooling fan/AGS power consumption. This step may be repeated iteratively until a suitable pairing is identified.

In still yet another aspect, a method for optimizing vehicle power consumption is described comprising, in a vehicle providing a cooling fan, an active grille shutter (AGS) system, and a plurality of heat exchangers each having an airflow requirement which changes similarly on a specified change in a rate of travel of the vehicle and/or a required rate of heat exchange from the heat exchanger to the cooling airflow. At least one controller including a processor comprising computer-executable instructions is provided also.

The method further includes, by the at least one controller, selecting a pairing of a cooling fan speed and an AGS system position which provides a required airflow to a dominant one of the plurality of heat exchangers at a least cooling fan/AGS power consumption.

In the following description, there are shown and described embodiments of the disclosed methods and systems for controlling vehicle power consumption. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed methods and systems for controlling vehicle power consumption, and together with the description serve to explain certain principles thereof. In the drawing.

Reference will now be made in detail to embodiments of the disclosed methods and systems for controlling vehicle power consumption, examples of which are illustrated in the accompanying drawings and figures.

DETAILED DESCRIPTION

Figure 1:
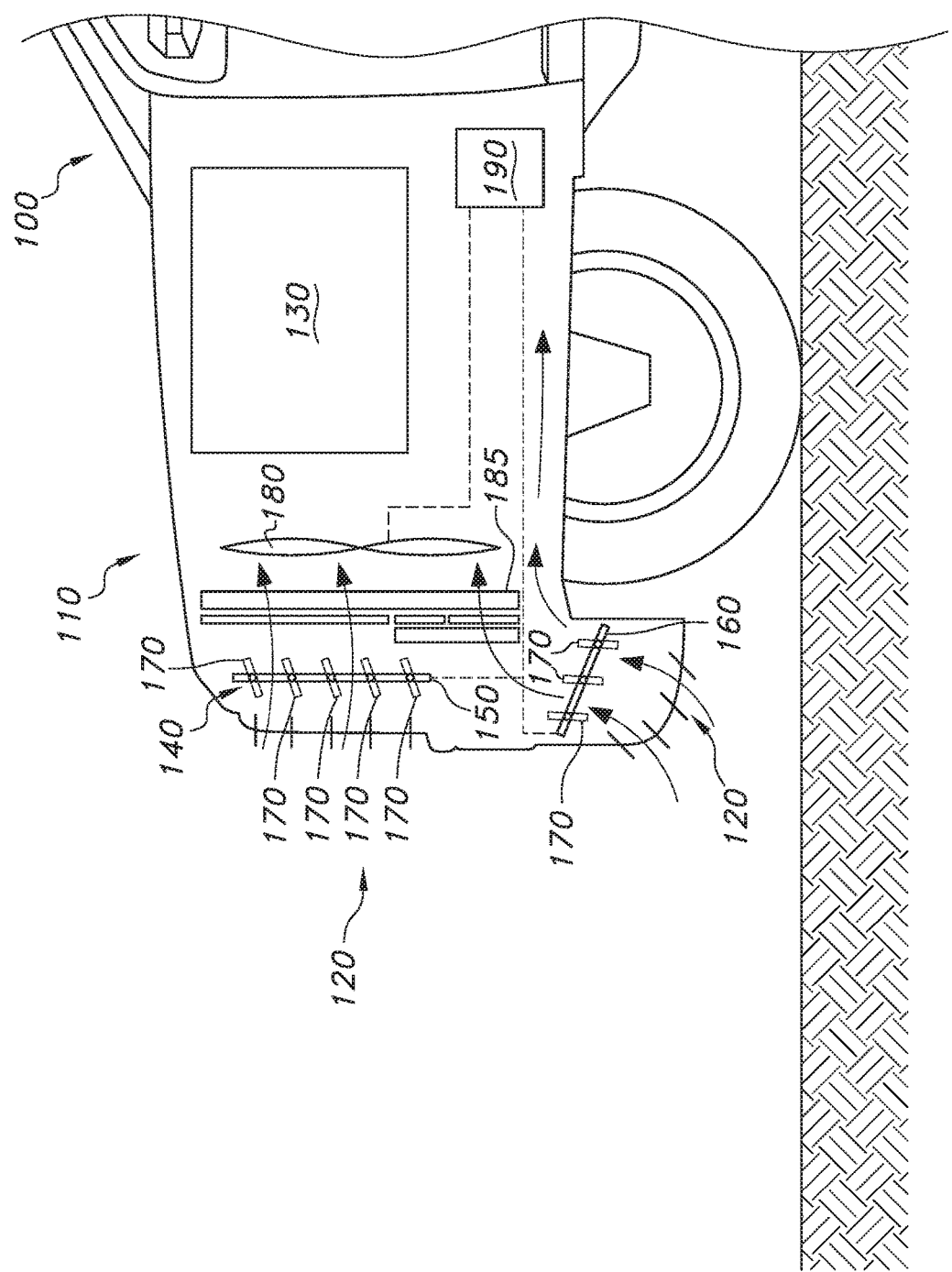
FIG. 1 depicts a vehicle including a cooling module comprising an active grille shutter (AGS) system and a cooling fan.

With reference to FIG. 1, there is shown a vehicle 100 front end 110 including a grille element 120 and an engine package depicted generally as reference numeral 130. The depicted grille element 120 includes upper and lower grille members disposed in front of upper and lower engine compartment openings, although it is well-known to provide grille elements including only a single engine compartment opening. The skilled artisan will readily appreciate that the presently described methods and systems for controlling vehicle power consumption are equally suitable for such vehicles.

The vehicle 100 further includes a cooling package comprising an active grille shutter (AGS) system 140, in the depicted embodiment provided by an upper AGS assembly 150 and a lower AGS assembly 160 respectively disposed within the upper and lower engine compartment openings. Each AGS assembly 150, 160 comprises a plurality of pivoting shutters or louvers 170 which may be pivoted about a central axis to control an airflow of exterior air (see arrows) into the vehicle 100 engine compartment and/or over/through various elements of the vehicle drivetrain, particularly when the vehicle is in motion. Again, it is known to provide vehicles including only a single AGS shutter assembly, and the presently described methods and systems for controlling vehicle power consumption are equally suitable for such vehicles.

The cooling package further includes a cooling fan 180 operatively connected to a vehicle power source (not shown), which may operate at a range of fan speeds to provide a cooling airflow over the engine package 130 and a variety of heat exchangers, represented generally as heat exchangers 185 $a \ldots n$, associated therewith. It will be appreciated that the variety of heat exchangers represented generally as heat exchangers 185 $a \ldots n$ likewise herein designates heat exchangers 185 associated with the vehicle drivetrain.

Non-limiting examples of vehicle components for which heat exchangers 185 are typically provided to meet the components cooling requirements include the vehicle engine, transmission, air- and/or liquid-cooled intercoolers, battery, air conditioning system, electric motors, energy conversion devices such as boost/buck converters, inverters, computer equipment for autonomous and non-autonomous vehicles, fuel cells, compressors, condensers for fuel cell systems, coolers for various controllers including pumps/fans/compressors/batteries/motors, and others.

Figure 2:
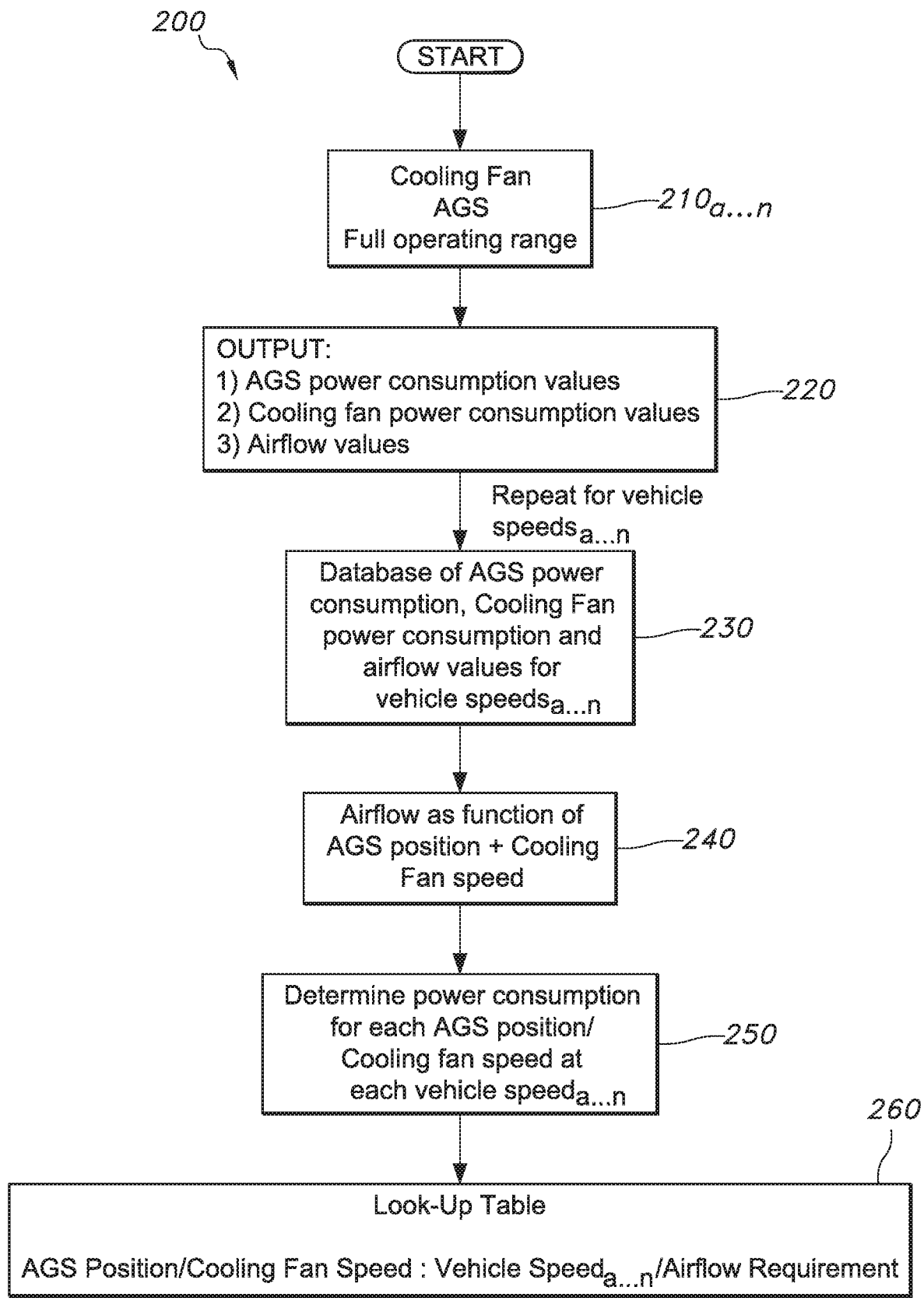
FIG. 2 depicts in flow chart form a method for determining a minimum combined power consumption to provide a required airflow according to the present disclosure FIG. 3 graphically depicts air flow contours (SCFM) plotted as a function of cooling fan speed (rpm) and AGS system position (% open)

FIG. 2 illustrates a method 200 for controlling vehicle power consumption according to the present disclosure. The initial hypothesis is that, for any given vehicle 100 operating condition (speed, ambient temperature, etc.) and for a given heat exchanger cooling airflow requirement, there is a minimum AGS system 140 and cooling fan 180 total combined power consumption value that will provide the required airflow for a heat exchanger. Initially, at step $210_{a \ldots n}$, for each of a range of vehicle rates of travel or speeds a . . . n, the cooling fan 180 and AGS system 140 are each operated through their respective entire operating ranges. That is, the cooling fan 180 is operated at each possible fan speed from "off" to the highest possible fan speed, and the AGS system 140 is tested through an entire range of operation from fully closed louvers 170 (least airflow allowed and least aerodynamic drag created) to fully opened louvers (most airflow allowed and greatest aerodynamic drag created). Alternatively, the cooling fan 180 and the AGS system 140 may be operated through a predetermined incrementally increasing set of settings from lowest to highest. As the skilled artisan will appreciate, this step may be accomplished by actual experimentation or by computer modelling.

Step 210 provides, at step 220, outputs defining a two-dimensional data matrix for the full operating ranges of the AGS system 140 and the cooling fan 180 at a given vehicle speed, with the outputs being: 1) AGS system power usage; 2) cooling fan power usage; and 3) cooling airflow provided to and/or through each heat exchanger. There are a number of suitable methods for acquiring these outputs, all well known to the skilled artisan. For example, air flow can be determined via Computational Fluid Dynamics (CFD) or actual in-vehicle measurements. Power consumption attributable to the AGS system 140 position is manifested as an increase in vehicle drag which translates into increased power consumption at a given vehicle speed. The increased drag can be measured in-vehicle or through CFD Likewise, fan power consumption can be measured directly in-vehicle or determined through CFD computations and an accompanying fan power model.

Step 210 is repeated as needed for a desired range of vehicle speeds a . . . n, the end result being an outputted database 230 including values for: 1) AGS system 140 power usage, i.e. an increase in vehicle aero power due to the increased drag associated with opening the AGS louvers or shutters; 2) cooling fan 180 power usage; and 3) cooling airflow provided for each selected vehicle speed and over a full operating range of the AGS system and the cooling fan. As will be appreciated, this database 230 comprises a full range of cooling airflow values over/through each heat exchanger in the path of the airflow. The database 230 further includes a full range of AGS system 140 power consumption values and cooling fan 180 power consumption values.

Next, at step 240 the database 230 is processed to determine airflow as a function of cooling fan 180 speed and AGS system 140 position (i.e., louver % opened) pairings for a particular vehicle 100 speed. This information can be depicted as a range of airflow contours $300_{a \ldots n}$. As one non-limiting example, contour line 300e (see FIG. 3) represents an airflow value of 1200 SCFM. This 1200 SCFM airflow value can be provided by a variety of cooling fan 180 speeds and AGS system 140 positions ranging from a cooling fan speed of >2600 rpm and an AGS system position of approximately 7-10% open to a cooling fan speed of approximately 700-800 rpm and an AGS system position of approximately 80-100% open. As the skilled artisan will appreciate, each of these cooling fan 180/AGS system 140 pairings will result in a different combined power consumption level. The next task is to find the lowest combined power consumption level providing the desired airflow value.

Figure 3:
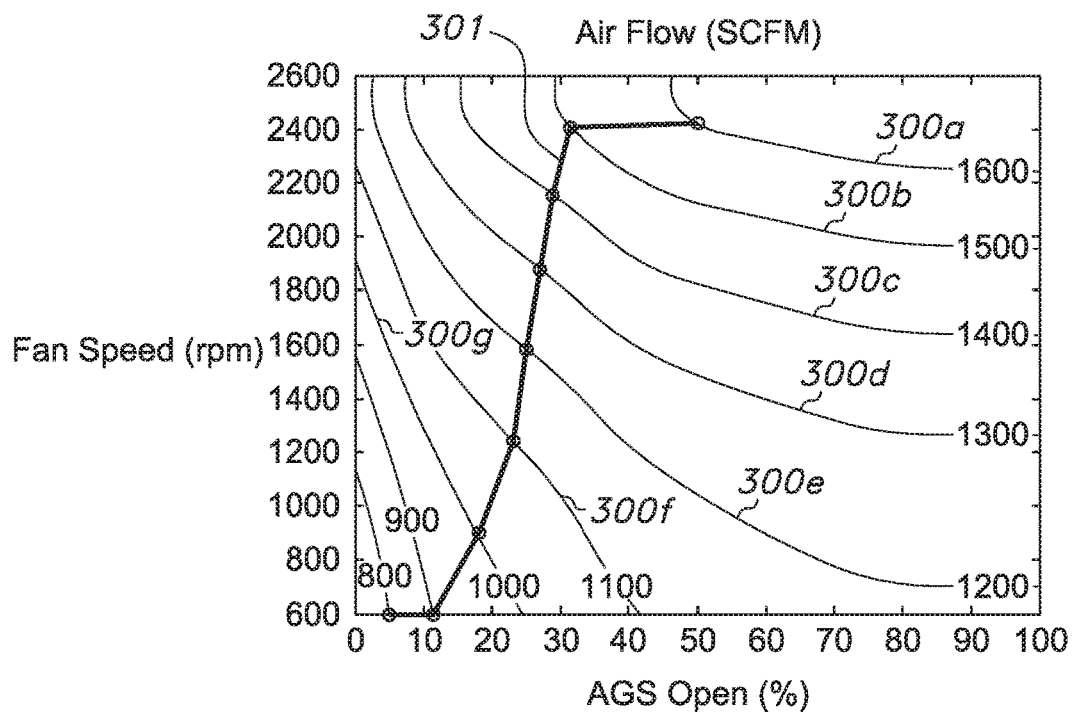
Figure 4:
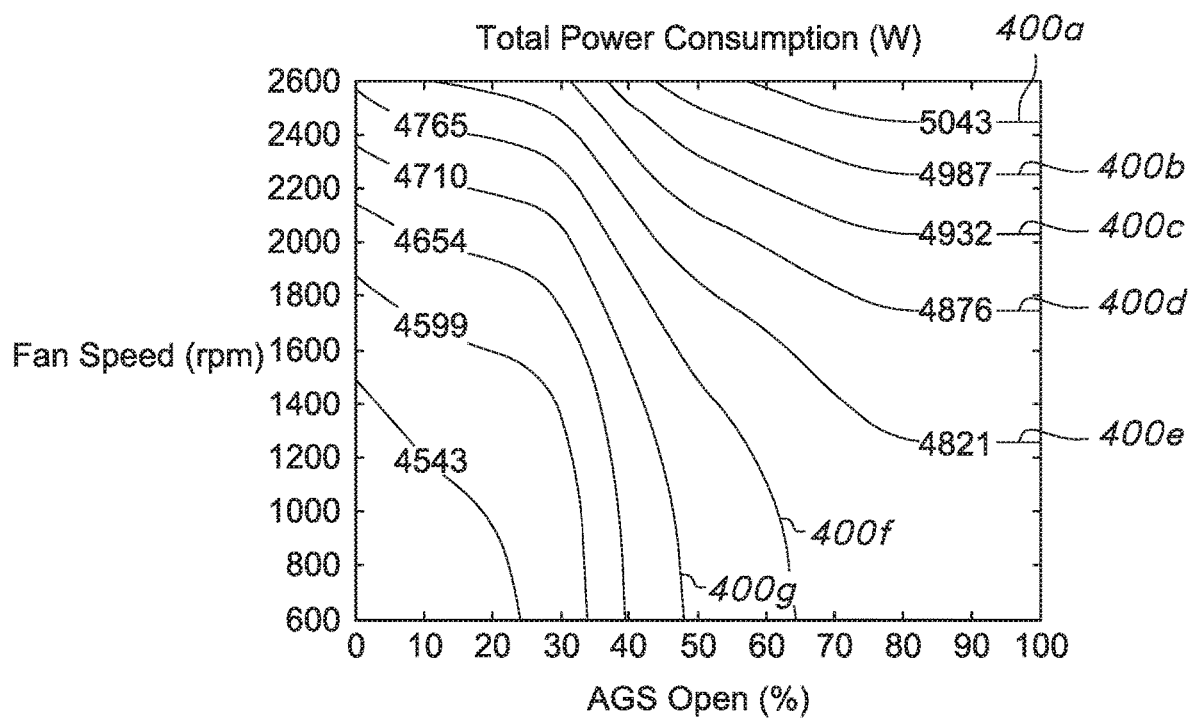
FIG. 4 graphically depicts combined total power consumption (W) plotted as a function of cooling fan speed (rpm) and AGS system position (% open)

Returning to FIG. 2, at step 250 the cooling fan 180/AGS system 140 pairings depicted in FIG. 3 are used to determine a combined cooling fan/AGS system power usage, i.e. total combined power consumption value $400_{a \ldots n}$ (see FIG. 4) for each pairing. By overlaying the combined power usage so determined with the airflows provided by the same pairings (see FIG. 3) the combined power usage for a given airflow across the range of pairings which can provide said airflow is determined. The pairing providing the minimum power usage value so as to deliver said airflow value can then be determined by any suitable method, for example by solving for the minimum by differentiation. Returning to FIG. 3 the results of this minimum power determination for the determined range of airflows, represented generally as line 301 whereby at a given airflow as depicted by contour lines 300 a . . . n the minimum combined cooling fan/AGS system power usage is given by the intersection of line 301 and the airflow contours. The process is repeated for the entire selected range of vehicle speeds a . . . n and desired cooling airflows to provide a map or look-up table 260 of combined minimum power consumption pairings of AGS system 140 position and cooling fan 180 speed, mapped to each vehicle speed a . . . n and each heat exchanger cooling airflow requirement. This can be conceptualized as a two-dimensional graph with vehicle speed a . . . n and heat exchanger airflow requirement as the axes and with the minimum total combined power consumption provided by the AGS system 140 and cooling fan 180 speed pairings at each point.

This look-up table 260 is made part of the controls calibrations for the cooling strategy to be used in-vehicle. The strategy calls for one or more vehicle controllers (depicted generally as reference numeral 190; see FIG. 1) operatively connected to the AGS system 140 and the cooling fan 180 to determine a required airflow for particular systems they control. The controller(s) 190 then utilize the look-up table 260 to determine, from determined vehicle speed information, the AGS system 140 position/cooling fan 180 speed pairing providing the minimum total combined power consumption that will provide the required airflow.

The nature and design of controllers 190 such as are used to control and monitor various vehicle 100 system functions including cooling systems/heat exchangers 185 are well-known in the art. At a high level, controllers 190 comprise processors or microprocessors, storage, and memory. The controllers may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data such as the look up tables 260 provided by the calculations and test data described above, stored within the memory. The controllers 190 may communicate with other vehicle systems and controllers over one or more wired or wireless vehicle connections using common bus protocols (e.g., CAN and LIN). Used herein, a reference to "a controller" refers to one or more controllers.

Figure 5:
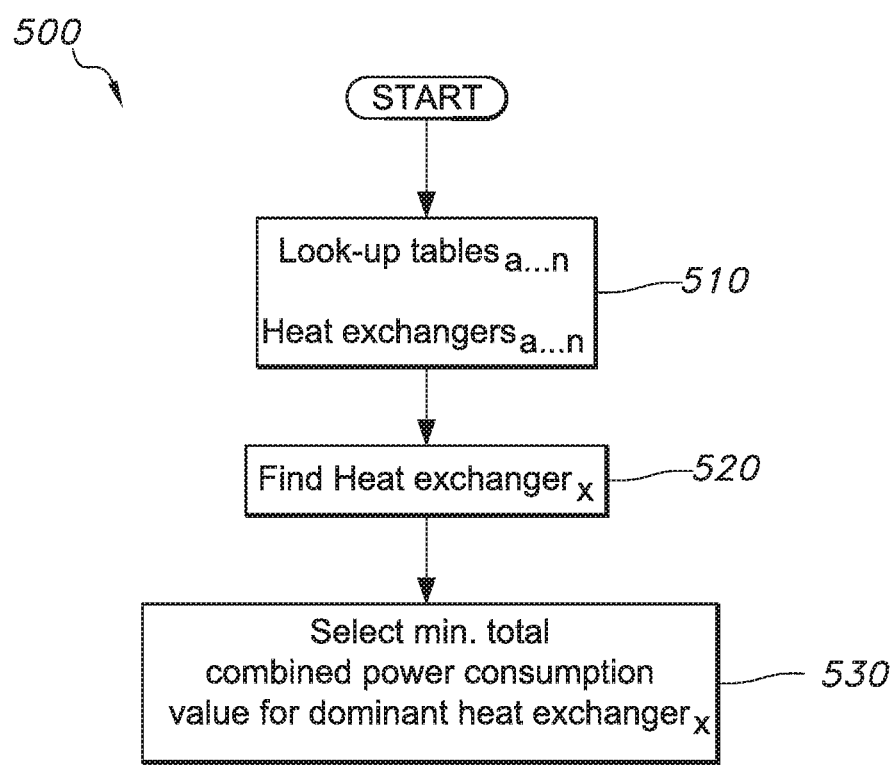
FIG. 5 depicts in flow chart form an embodiment of a method for determining a minimum combined power consumption to provide a required airflow satisfying the needs of multiple heat exchangers.

In one embodiment depicted in FIG. 5, a cooling strategy 500 is shown representing a situation where there are multiple airflow requests for multiple heat exchangers 185a . . . n, i.e. each heat exchanger of the heat exchanger group a . . . n has a required airflow for cooling purposes according to a vehicle rate of travel, ambient temperature or other ambient conditions, required rate of heat exchange from the heat exchanger to the cooling airflow, etc. Initially, at step 510 a separate look-up table $260_{a \ldots n}$, created as described above, is provided for each heat exchanger a . . . n and stored by controller 190 in memory. As described, each look-up table 260 includes the airflow requirement for a selected heat exchanger as a function of each determined vehicle speed a . . . n. As one non-limiting example, a first heat exchanger may be a vehicle 100 air-conditioner condenser requiring a cooling airflow value of 800 SCFM, and a second heat exchanger may be the vehicle 100 radiator requiring a cooling airflow value of 1500 SCFM in a particular situation of vehicle speed, ambient temperature, ambient pressure, and required rate of heat exchange. As will be appreciated by the skilled artisan, these airflow needs may be predetermined experimentally and/or modelled by computer, and stored by the controller 190 in memory. For example, air flow can be determined by modeling via Computational Fluid Dynamics (CFD) or by actual in-vehicle measurements. At step 520 the controller 190 determines which specific heat exchanger a . . . n's airflow needs (i.e. the "dominant" heat exchanger, designated generally as heat exchanger "x" in the drawing figure) will satisfy the airflow needs of the remaining heat exchangers 185a . . . n. The analysis depicted in FIG. 2 is or has been performed a priori for each heat exchanger a . . . n as described. Given that the dominant heat exchanger's airflow needs will satisfy all the other heat exchanger's airflow needs, the minimum total combined power consumption pairing so as to provide the desired airflow for the dominant heat exchanger is selected (step 530). In this way, all heat exchangers will receive at a minimum their desired airflows with all but the dominant heat exchanger generally receiving more than desired with the dominant heat exchanger receiving that which is desired.

So in this example, the AGS system 140/cooling fan 180 pairing providing 800 SCFM to the air-conditioner condenser at a minimum combined power consumption value may only provide 1250 SCFM to the radiator. However, the AGS system 140/cooling fan 180 pairing providing 1500 SCFM to the radiator at a minimum combined power consumption value may provide 960 SCFM to the air-conditioner condenser. Therefore the controller 190 will select the AGS system 140 position/cooling fan 180 speed pairing providing the airflow required by the radiator at a minimum total combined power consumption value. The airflow provided at this setting also satisfies the air conditioner's airflow needs to excess. In this situation the radiator would be considered the dominant heat exchanger of the multiple heat exchangers 185a . . . n. As will be appreciated, the foregoing example including two heat exchangers 185 is presented for simplicity only, and the described analysis is equally and straightforwardly applicable to 3, 4, 5, and more heat exchangers.

As will be appreciated, a similar strategy can be readily developed in which exact heat exchanger a . . . n airflow requirements are not known, but instead only a need for "more or less airflow" is known. In this situation an assessment of the present airflow situation could be made, again through the same look-up tables 260 as described above. A particular heat exchanger controller 190 may issue a request for more or less airflow based on the same variables, i.e. vehicle speed, ambient temperature, ambient pressure, and required rate of heat exchange. The controller 190—issued "more or less airflow" request can be converted into an airflow delta to arrive at a target and then the strategy 500 described above can be implemented to select a particular heat exchanger required airflow value which will satisfy all airflow requirements of the set of heat exchangers 185a . . . n. If this delta was not sufficient for the heat exchanger requesting more airflow, the request for more airflow will persist and the method can continue to be used perhaps with some modification of the delta airflow number realized by converting the delta request into a larger or smaller value.

As an example, assume that the controller 190 determines that more airflow is needed through the radiator. This could be done utilizing commonly available feedback temperature signals such as Cylinder Head Temperature or Engine Coolant Temperature. Both of these signals have desired upper limits, for example 115° C. A scheduled 'delta' table can be created based on multiple factors including proximity of the sensed temperature(s) to limit, engine power output, and ambient temperature. The higher the sensed temperature, the higher the load, and the higher the ambient temperature, the higher the delta airflow would be. So, if the engine is putting out 65 kW, the coolant temperature is 114° C., and the ambient is 40° C., the airflow delta might be 1000 SCFM. On the other end of the spectrum, if the engine is putting out 8 kW, the coolant temperature is 112° C. and the ambient temperature is 20° C., the airflow delta might be 100 SCFM.

As another example, returning to the situation wherein specific heat exchanger a . . . n airflow requirements are not known and/or cannot be determined, it is known in the art to provide a controller 190 configured to select a predetermined cooling fan 180/AGS system 140 pairing that will provide a predetermined airflow to vehicle component systems having a cooling airflow demand that varies according to one or more vehicle operating conditions. This cooling airflow demand could be for the engine package 130, for all components disposed in the engine compartment 110, for the drivetrain, etc., and may vary according to a variety of inputs including without intending any limitation vehicle rate of travel, ambient temperature, ambient pressure, required rate of heat exchange, and others. As will be appreciated, these inputs can be provided to the controller 190 by a number of sensors of a type well known in the art.

However, the controller 190 may not have the capability of determining an exact airflow requirement for each individual one of multiple heat exchangers 185a . . . n disposed in association with a vehicle component system at any given time, but instead as is more common may be configured to simply select a predetermined fan speed/AGS position pairing without explicit consideration for actual airflow values needed according to various measurable factors such as operating temperatures of various systems utilizing the heat exchangers, vehicle rate of travel, ambient temperature, ambient barometric pressure, required rate of heat exchange, etc. This selected fan speed/AGS position pairing may be selected by any one of or multiple control methods/strategies known to those skilled in the art such as state-based control strategies, look-up table based control strategies, feedback (e.g. proportional and integral (PI) feedback or proportional-integral-derivative (PID) feedback) control strategies, and feed-forward control strategies.

Next, by way of the same or a different look-up table 260, this selected cooling fan 180/AGS position pairing is mapped to predetermined airflow values for all heat exchangers 185a . . . n. These predetermined airflows for each heat exchanger 185a . . . n then become the required airflows for each heat exchanger, and through the method described above the minimum power consumption fan speed/AGS position pairing which provides the necessary airflows is selected thereby overwriting the initially selected pairing. In other words, as an example the controller 190 may be configured to interpret various inputs as summarized above as "at an engine coolant temperature of 110 Deg. C, and a rate of travel of 50 m.p.h. and an ambient temperature of 75° F." a fan speed of 1000 RPM and an AGS opening of 30% is selected. From look-up table 260, airflows for each heat exchanger are determined and the dominant heat exchanger (i.e., requiring the greatest airflow) is selected which, in this non-limiting example, could be the engine radiator which requires a cooling airflow of 800 SCFM. From the look-up table 260 of predetermined minimum combined power consumption AGS system 140/cooling fan 180 pairings mapped to cooling airflow rates, the pairing which provides 800 SCFM to the radiator is selected thereby overwriting the initially selected fan speed/AGS position pairing.

In other words, the initially selected predetermined cooling fan 180/AGS system 140 pairing, selected by conventional means such as state-based, look-up table based, feedback, and feed forward methods, may not provide the least possible total combined power consumption value, being selected from a stored listing of predetermined cooling fan 180/AGS system 140 pairings, or other control strategy known to those skilled in the art for selecting such pairings such as PI control, given in response to various measurable factors as described without any consideration of each heat exchanger's airflow requirements and combined AGS/fan pairing power consumption. To address such situations, in an embodiment the above-described method is used as a corrector for an existing cooling fan 180/AGS system 140 control system so as to provide the same intended airflow, although not explicitly predetermined as such, by the minimum power consumption cooling fan 180/AGS system 140 pairing.

Figure 6:
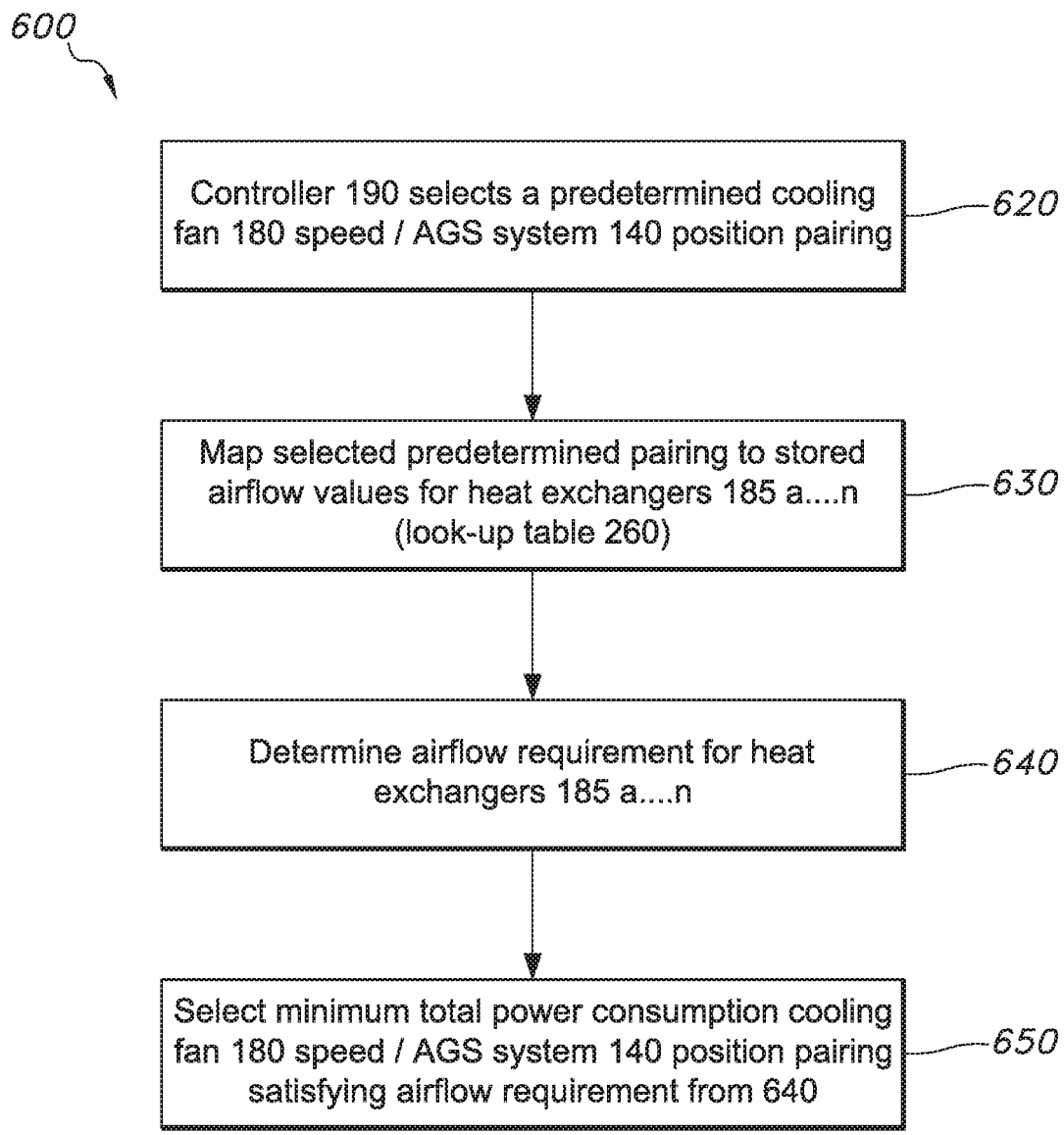
FIG. 6 depicts in flow chart form an alternative embodiment of a method for determining a minimum combined power consumption to provide a required airflow satisfying the needs of multiple heat exchangers.

An embodiment of this corrective method is shown at a high level in FIG. 6 illustrating a cooling strategy 600. At step 620, the controller 190 selects a predetermined cooling fan 180 speed/AGS system 140 position pairing according to one or more vehicle inputs as described above. This is done with no knowledge or consideration of actual heat exchanger airflow requirements, or even of what airflow will be provided by the selected predetermined cooling fan 180 speed/AGS system 140 position pairing. At step 630, the predetermined pairing is mapped to stored airflow values for heat exchangers 185 a . . . n, stored in one or more look-up tables 260 and determined as described above. By this step, a determination can be made of what actual airflow value has been requested by the controller 190 even though the controller was not configured to request a specific airflow per se. Also, the airflow requirements for each heat exchanger 185a . . . n are now known (step 640).

At step 650, by the methods described above, the determined airflow value request is mapped by way of look-up table 260 or another look-up table to a cooling fan 180 speed/AGS system 140 position pairing that will provide the requested determined airflow at a minimum total power consumption.

Figure 7:
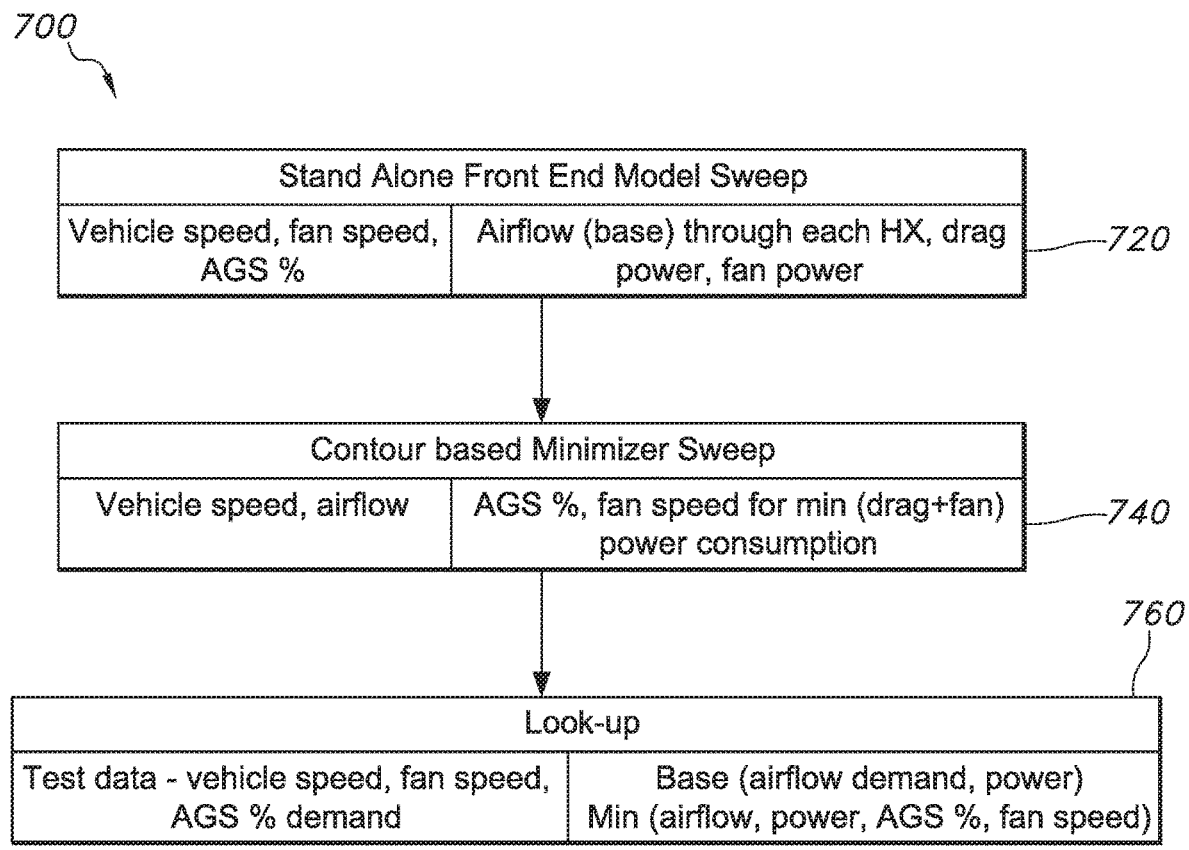
FIG. 7 further illustrates the method of FIG. 6.

The corrective method of FIG. 6 is further illustrated in more detail in FIG. 7. It is presumed that the controller 190 has determined a need for "more or less airflow," which may be determined from one or more of various vehicle system operating temperatures, loads, ambient temperature, refrigerant head pressures, explicit cooling requests, and others. Again, as described above this may be reflective of a cooling request relative to the needs of one or more individual heat exchangers 185a . . . n, from one or more vehicle systems such as the engine package 130, for all components disposed in the engine compartment 110, for the drivetrain, etc., and others. As described above, through various known control methods/strategies including state-based, look-up table based, feedback (e.g. PI or PID control), and feed-forward methods, the controller 190 selects a predetermined cooling fan 180 speed/AGS system 140 position pairing. This is done without any consideration of actual airflow requirements for any heat exchanger 185a . . . n, or for that matter what airflow is provided by the selected predetermined cooling fan 180 speed/AGS system 140 position pairing. The controller 190 is simply configured to select a predetermined cooling fan 180 speed/AGS system 140 position pairing based on a perceived need for cooling as determined by one or more vehicle inputs as summarized above.

At step 720, by the methods described in detail above in the discussion of FIGS. 2 and 3, a base airflow, AGS system 140 position/drag (i.e., AGS power consumption at a range of operating positions), and cooling fan 180 speed/power consumption are determined over a range of vehicle operating conditions. These values are saved to one or more look-up tables 260. At step 740, again by the methods described above in the discussion of FIGS. 2 and 3, the cooling fan 180 speed/AGS system 140 position pairings providing the determined airflows at a minimum combined power consumption are determined and saved to a same or a different look-up table 260.

At step 760, the controller 190—selected predetermined cooling fan 180 speed/AGS system 140 position pairing is mapped to the look-up table 260 containing the previously determined airflows for each heat exchanger 185a . . . n provided over a range of vehicle operating conditions. As will be appreciated, this step 760 allows determination of the actual airflow requested by the controller 190 in selecting the predetermined cooling fan 180 speed/AGS system 140 position pairing. That actual airflow can then be mapped to the look-up table containing the determined cooling fan 180 speed/AGS system 140 position pairings providing that actual airflow at a minimum combined power consumption, which pairing is then selected by the controller 190. By this step, the controller 190—selected predetermined cooling fan speed 180/AGS system 140 position pairing is corrected to supply a needed but unquantified cooling airflow at a minimum combined power consumption by the cooling fan 180 and AGS system 140.

Obvious modifications and variations are possible in light of the above teachings. All such modifications and variations are within the scope of the appended claims when interpreted in accordance with the breadth to which they are fairly, legally and equitably entitled.

What is claimed:

1. A system for optimizing power consumption of a vehicle, comprising:
   a cooling fan;
   an active grille shutter (AGS) system;
   a plurality of heat exchangers; and
   at least one controller including a processor comprising computer-executable instructions;
   wherein the controller is configured to, according to criteria consisting of a vehicle rate of travel and an airflow requirement of a dominant one of the plurality of heat exchangers, select a pairing of a cooling fan speed and an AGS system position that will provide the airflow requirement at a minimum combined cooling fan power consumption and AGS system-induced aerodynamic drag power.

2. The system of claim 1, wherein the controller is further operatively connected to a cooling fan control system and an AGS system control system.

3. The system of claim 1, wherein the controller selects the pairing from one or more stored look-up tables comprising a plurality of cooling fan speed values and a plurality of AGS position values, all mapped to a plurality of vehicle speed values and a plurality of heat exchanger airflow requirement values.

4. The system of claim 3, wherein a separate stored look-up table is provided for each one of the plurality of heat exchangers, the separate stored look-up table comprising a plurality of cooling fan speed values and a plurality of AGS position values mapped to a plurality of vehicle speed values and an airflow requirement value for the one of the plurality of heat exchangers.

5. A vehicle including the system of claim 1.

6. A method for optimizing vehicle power consumption, comprising:
   in a vehicle, providing a plurality of heat exchangers, a cooling fan, and an active grille shutter (AGS) system;
   providing at least one controller including a processor comprising computer-executable instructions; and
   by the at least one controller, according to criteria consisting of a vehicle rate of travel and an airflow requirement of a dominant one of the plurality of heat exchangers, selecting a pairing of a cooling fan speed and an AGS system position which provides the airflow requirement at a minimum combined cooling fan power consumption and AGS system-induced aerodynamic drag power.

7. The method of claim 6, including disposing the plurality of heat exchangers in a vehicle engine compartment and/or associated with a vehicle drivetrain.

8. The method of claim 6, further including operatively connecting the controller to a cooling fan control system and an AGS system control system.

9. The method of claim 6, including, by the controller, selecting the pairing from one or more stored look-up tables comprising a plurality of cooling fan speed values and a plurality of AGS position values, all mapped to a plurality of vehicle speed values and a plurality of heat exchanger airflow requirement values.

10. The method of claim 9, further including providing a separate stored look-up table for each one of the plurality of heat exchangers, the separate stored look-up table comprising a plurality of cooling fan speed values and a plurality of AGS position values mapped to a plurality of vehicle speed values and an airflow requirement value for the one of the plurality of heat exchangers.

11. The method of claim 10, further including, by the controller, determining whether the selected pairing provides a required airflow for others of the plurality of heat exchangers, and if not, selecting a different pairing which provides the required airflow for others of the plurality of heat exchangers at a least possible cooling fan and AGS system power consumption.

12. The method of claim 11, including, by the controller, repeating the step of selecting a different pairing until a pairing is identified which provides the required airflow for others of the plurality of heat exchangers at a least possible cooling fan and AGS system power consumption.

13. A method for optimizing power consumption in a vehicle comprising one or more component systems and/or one or more heat exchangers, a cooling fan, and an active grille shutter (AGS) system, consisting essentially of:
   determining a need for more or less airflow for the one or more component systems and/or the one or more heat exchangers according to a vehicle operating condition as indicated by one or more inputs representative of the vehicle operating condition or one or more predetermined assessments of an airflow requirement relative to the vehicle operating condition;
   selecting a first predetermined pairing of a cooling fan speed and an AGS system position according to the one or more inputs representative of the vehicle operating condition or the one or more predetermined assessments;
   calculating an airflow requirement for the one or more heat exchangers based on the first predetermined pairing;
   according to criteria consisting of a vehicle rate of travel and the calculated airflow requirement, selecting a second predetermined pairing of a cooling fan speed and an AGS system position which provides the calculated airflow requirement at a minimum combined cooling fan and AGS system power consumption;
   comparing the first predetermined pairing and the second predetermined pairing; and
   correcting the first predetermined pairing by selecting the second predetermined pairing to provide the calculated airflow requirement at the minimum combined cooling fan and AGS system power consumption.

14. The method of claim 13, including implementing the steps of determining, selecting, calculating, comparing, and correcting by one or more controllers at least one of which operatively communicates with a control system for one or both of the cooling fan and the AGS system.

15. The method of claim 14, wherein the one or more inputs representative of the vehicle operating condition are selected from the group consisting of: a vehicle rate of travel, an ambient temperature, an ambient pressure, a state based control strategy, a look-up table-based control strategy, a feedback control strategy, a proportional and integral (PI) feedback control strategy, a proportional-integral-derivative (PID) feedback control strategy, and a feed-forward control strategy.

16. The method of claim 14, wherein the second predetermined pairing is comprised in one or more look-up tables stored by the one or more controllers.

17. The method of claim 14, including, by the one or more controllers, calculating the airflow requirement for the one or more heat exchangers by mapping the first predetermined pairing to a database of stored airflow values for the one or more heat exchangers.

18. The method of claim 17, further including, by the one or more controllers, determining an airflow requirement for the one or more heat exchangers.

* * * * *